(12) United States Patent
Toyota

(10) Patent No.: US 9,002,604 B2
(45) Date of Patent: Apr. 7, 2015

(54) SHIFT CONTROL DEVICE OF AUTOMATIC TRANSMISSION

(75) Inventor: Ryohei Toyota, Hiratsuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/347,200

(22) PCT Filed: Jul. 18, 2012

(86) PCT No.: PCT/JP2012/068163
§ 371 (c)(1),
(2), (4) Date: Mar. 25, 2014

(87) PCT Pub. No.: WO2013/046871
PCT Pub. Date: Apr. 4, 2013

(65) Prior Publication Data
US 2014/0236437 A1  Aug. 21, 2014

(30) Foreign Application Priority Data

Sep. 26, 2011 (JP) .................................. 2011-208387

(51) Int. Cl.
| | |
|---|---|
| *B60W 10/08* | (2006.01) |
| *B60W 10/10* | (2012.01) |
| *F16H 61/02* | (2006.01) |
| *B60K 6/36* | (2007.10) |
| *B60K 6/445* | (2007.10) |
| *B60K 6/547* | (2007.10) |
| *B60W 20/00* | (2006.01) |
| *F16H 61/10* | (2006.01) |
| *F16H 37/08* | (2006.01) |

(52) U.S. Cl.
CPC .............. *F16H 61/0213* (2013.01); *B60K 6/36* (2013.01); *B60K 6/445* (2013.01); *B60K 6/547* (2013.01); *B60W 10/10* (2013.01); *B60W 20/00* (2013.01); *F16H 61/10* (2013.01); *B60W 10/08* (2013.01); *B60W 2710/083* (2013.01); *F16H 2037/0873* (2013.01); *B60W 20/20* (2013.01); *Y02T 10/6239* (2013.01); *F16H 2710/24* (2013.01)

(58) Field of Classification Search
USPC .................... 701/54, 55, 56, 58; 477/15, 115
See application file for complete search history.

(56) References Cited

U.S. PATENT DOCUMENTS

| | | |
|---|---|---|
| 5,025,684 A | 6/1991 | Stehle et al. |
| 5,655,990 A | 8/1997 | Ooyama et al. |

(Continued)

FOREIGN PATENT DOCUMENTS

| | | |
|---|---|---|
| JP | 3-117776 A | 5/1991 |
| JP | 7-322416 A | 12/1995 |

(Continued)

*Primary Examiner* — Edwin A Young
(74) *Attorney, Agent, or Firm* — Foley & Lardner LLP (57) ABSTRACT

A target shift stage comes to a high speed stage at t2, during reduction toward zero of a motor torque by an accelerator pedal releasing operation from t1, and an up-shift shift request along with the torque reduction is generated. The shift request is executed for the first time at t3, and the automatic transmission is shifted up to a high speed stage from a current low speed stage selecting state. Therefore, even in the case that a request for increasing a motor regenerative torque is issued by a braking operation just after (t2 to t3) an up-shift shift request moment t2 in response to the torque reduction, the gear shift in response thereto is not generated, and it is possible to avoid generation of repeated gear shift of low speed stage→high speed stage→low speed stage for a short time.

5 Claims, 6 Drawing Sheets

(56) References Cited

U.S. PATENT DOCUMENTS

| | | |
|---|---|---|
| 6,290,627 B1 | 9/2001 | Kusafuka et al. |
| 8,423,213 B2 * | 4/2013 | Tsuda et al. ............ 701/22 |
| 2008/0196955 A1 * | 8/2008 | Minamikawa ......... 180/65.2 |
| 2009/0024288 A1 * | 1/2009 | Kuwahara et al. ......... 701/54 |
| 2009/0149296 A1 * | 6/2009 | Eastman et al. ......... 477/115 |
| 2009/0192020 A1 | 7/2009 | Futamura et al. |
| 2009/0227408 A1 * | 9/2009 | Imamura et al. ........... 475/5 |
| 2009/0227417 A1 * | 9/2009 | Imamura et al. ........... 477/5 |
| 2010/0004833 A1 * | 1/2010 | Nozaki et al. ............ 701/58 |
| 2011/0208394 A1 * | 8/2011 | Kuwahara et al. ......... 701/54 |

FOREIGN PATENT DOCUMENTS

| | | |
|---|---|---|
| JP | 2000-224713 A | 8/2000 |
| JP | 2000-274525 A | 10/2000 |
| JP | 2006-29491 A | 2/2006 |
| JP | 2008-111491 A | 5/2008 |
| JP | 2009-180247 A | 8/2009 |

* cited by examiner

SHIFT CONTROL DEVICE OF AUTOMATIC TRANSMISSION

TECHNICAL FIELD

The present invention relates to a shift control device of an automatic transmission, more particularly to a technique for improving a shift quality of the automatic transmission which is inserted to a power transmission system transmitting power from an electric motor.

BACKGROUND ART

As a shift control technique of the automatic transmission which is inserted into the motor power transmission system in this way, there has been known a technique of shift-controlling the automatic transmission in accordance with a required motor torque of an electric motor, as described in Patent Literature 1.

The shift control technique as typified by the one described in the patent literature 1 determines a target deceleration to be achieved by a regenerative braking (a negative required motor torque) of the electric motor on the basis of a braking operation at the braking time. Next the shift control technique determines a required shift stage capable of achieving the target deceleration from the current transmission output rotational speed on the basis of a relation map between a shift stage of the automatic transmission which can achieve the target deceleration, and the transmission output rotational speed. And then, the shift control technique changes speed of the automatic transmission to the required shift stage.

In other words, in the case that the target deceleration is large, the automatic transmission is shifted down to the lower shift stage than the current shift stage.

Further, the shift control technique, at the accelerating time, determines a target driving force to be achieved by a driving torque (a positive required motor torque) of an electric motor on the basis of an accelerating operation, and changes speed of the automatic transmission to a lower shift stage which can achieve the target driving force.

In other words, the automatic transmission is shifted down to the lower shift stage than the current shift stage, even in the case that the target driving force is increased by the accelerating operation.

CITATION LIST

Patent Literature

Patent Literature 1: Japanese Patent Application Laid-Open Publication No. 2000-224713

SUMMARY OF INVENTION

Technical Problem

However, in the shift control technique mentioned above, in the case that the target deceleration becomes smaller by cancelling a braking operation, the automatic transmission is shifted up to a higher shift stage.

In the meantime, it is highly likely that an acceleration request (an increase of the target driving force) is generated by the accelerating operation, just after the target deceleration becomes smaller by cancelling the braking operation, and this means that a down-shift request of the automatic transmission is generated in response to the acceleration request at a high probability.

Therefore, according to the shift control technique, in the case that the driving operation as mentioned above is carried out, a repeated gear shift that the automatic transmission is temporarily shifted up and is shifted down just after the shift-up (for example, gear shift first speed→second speed→first speed) is repeated for a short time, plural times of shift shocks are generated for a short time as well as an uncomfortable feeling is applied, and in any case, it is inevitable that a problem relating to reduction of the shift quality is generated.

An object of the present invention is to provide a shift control device of an automatic transmission which can avoid the problem mentioned above about the reduction of the shift quality, by preventing the automatic transmission from carrying out the repeated gear shift mentioned above for a short time, even in the case that the driving operation as mentioned above is carried out.

Solution to Problem

For this purpose, the shift control device of the automatic transmission according to the present invention is configured as follows.

First of all, a description will be given of the shift control device of the automatic transmission which is a premise of the present invention.

The shift control device is used in the automatic transmission which is inserted into a power transmission system transmitting power from an electric motor, and is configured to shift-control the automatic transmission on a shift pattern in accordance with a motor torque absolute value of the electric motor.

The shift control device according to the present invention is characterized by a configuration that the following torque-reduction-response-shift-request determining unit and torque-reduction-response-shift delaying unit are provided in addition to the above.

The former torque-reduction-response-shift-request determining unit is configured to determine an up-shift request of the automatic transmission on the shift pattern along with the reduction of the motor torque absolute value caused by releasing an accelerator pedal, and further, the latter torque-reduction-response-shift delaying unit is configured to delay an execution start of the torque reduction response up-shift determined by the former unit, until when a set time elapses after the determining time.

Advantageous Effects of Invention

According to the shift control device of the automatic transmission based on the present invention, even in the case that the up-shift request of the automatic transmission along with the reduction of the motor torque absolute value caused by releasing the accelerator pedal is issued, the shift request is not immediately executed, but is delayed until when the set time elapses after the up-shift requesting time, and therefore, the following effects can be obtained.

In other words, in the case that the up-shift request of the automatic transmission along with the reduction of the motor torque absolute value caused by releasing the accelerator pedal is issued, it is highly likely that an accelerating operation for requesting an increase of the motor torque absolute value is carried out just after the shift request, and the down-shift request to a return direction of the automatic transmission is generated at a high probability in response to the operation, therefore the repeated gear shift as mentioned above is repeated for a short time, the plural times of shift shocks are generated for a short time as well as an uncomfortable feeling is applied, and in any case, a problem relating to the reduction of the shift quality is generated.

According to the present invention, however, the execution start of the up-shift request along with the reduction of the motor torque absolute value caused by releasing the accelerator pedal is delayed by the set time mentioned above, and therefore, even in the case that the operation for requesting the increase of the motor torque absolute value is carried out just after the up-shift request along with the reduction of the motor torque absolute value caused by releasing the accelerator pedal is issued, the down-shift of the automatic transmission in response to the operation is not caused, but it is possible to prevent the repeated gear shift as mentioned above from being repeated for a short time.

Accordingly, it is possible to improve the shift quality without generating the problem relating to the uncomfortable feeling by the repeated gear shift, and the plural times of shift shocks within the short time.

REFERENCE SIGNS LIST 1 engine
MG1 first motor/generator (power generator)
MG2 second motor/generator (electric motor)
2 power distribution device
6 first shaft
7 second shaft
8 low side shift mechanism
8a, 8b low speed stage gear set
8c dog clutch
9 high side shift mechanism
9a, 9b high speed stage gear set
9c friction clutch
11, 12 final drive gear set
13 differential gear device
14 drive wheel
21 controller
22 vehicle speed sensor
23 accelerator pedal sensor
24 brake sensor

DESCRIPTION OF EMBODIMENTS

A description will be given below of embodiments according to the invention on the basis of the accompanying drawings.

Embodiment 1

<Configuration>

Figure 1:
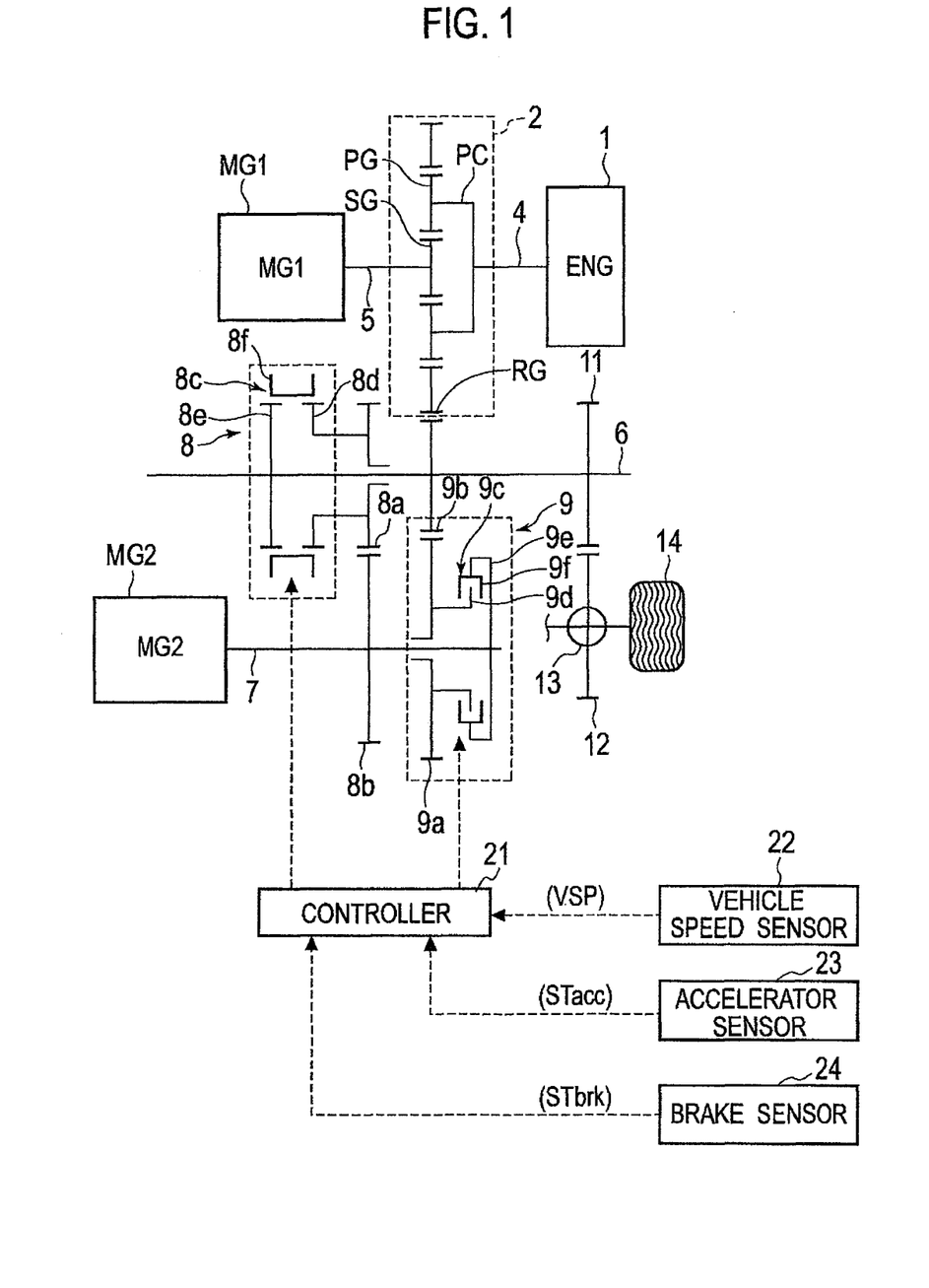
FIG. 1 is a schematic line map showing a driving device of a hybrid vehicle which includes an automatic transmission having a shift control device according to an embodiment of the present invention, together with a shift control system of the automatic transmission.

FIG. 1 shows a driving device of a hybrid vehicle which includes an automatic transmission having a shift control device according to an embodiment of the present invention, and the driving device is configured as described below.

The driving device has an engine (ENG) 1 which is an internal combustion engine, a first motor/generator MG1 which is mainly used as a power generator, and a second motor/generator MG2 which is used as an electric motor. These are used as power sources.

The engine 1 and the first motor/generator MG1 are mutually coaxial and are arranged face to face, and a power distribution device 2 is interposed between the both by being coaxially arranged.

The power distribution device 2 is configured by a simple planetary gear set including a center sun gear SG, a concentric ring gear RG which surrounds the sun gear, a plurality of pinions PG which engages with the sun gear SG and the ring gear RG, and a pinion carrier PC which rotatably supports the pinions PG.

The engine 1 connects its output shaft (a crank shaft) 4 to the pinion carrier PC of the power distribution device 2, and the first motor/generator MG1 connects its output shaft 5 to the sun gear SG of the power distribution device 2.

A first shaft 6 and a second shaft 7 are arranged side by side by being arranged in parallel to an arranging axis of the engine 1, the power distribution device 2 and the motor/generator MG1 which are arranged coaxially as mentioned above.

The second motor/generator MG2 used as the electric motor is connected in a driving manner to the second shaft 7, and an automatic transmission used when a motor power is output from the motor/generator MG2 sequentially via the second shaft 7 and the first shaft 6 is configured by a low side shift mechanism 8 and a high side shift mechanism 9 as described below.

The low side shift mechanism 8 is provided for selecting a low side transmission route at the time of outputting the above described motor power, and is provided by being arranged on the first shaft 6.

The high side shift mechanism 9 is provided for selecting a high side transmission route at the time of outputting the above described motor power, and is provided by being arranged on the second shaft 7.

The low side shift mechanism 8 is provided for rotationally engaging a gear 8a with the first shaft 6 or disconnecting the rotational engagement so that a low speed stage gear set constituted by the gear 8a which is rotatably supported on the first shaft 6, and a gear 8b which rotates together with the second shaft 7 connects in a driving manner between the first shaft 6 and the second shaft 7, and is configured by a dog clutch 8c which serves an engaging type shift element as described below.

The dog clutch 8c includes a clutch gear 8d which is provided in the gear 8a, a clutch hub 8e which is connected to the first shaft 6, and a coupling sleeve 8f, and forms clutch teeth having the same specification in each of outer peripheries of the clutch gear 8d and the clutch hub 8e.

In the case that the coupling sleeve 8f is at an illustrated engaging position at which the coupling sleeve 8f engages with both of the outer peripheral clutch teeth of the clutch gear 8d and the clutch hub 8e, the dog clutch 8c connects the gear 8a to the first shaft 6, and comes to an engaging state in which the motor power from the motor/generator MG2 can be transmitted from the second shaft 7 to the first shaft 6 by the gears 8b and 8a so as to be output.

At a non-engaging position at which the coupling sleeve 8f does not engage with one of the outer peripheral clutch teeth of the clutch gear 8d and the clutch hub 8e by being shifted in an axial direction from the illustrated position, the dog clutch 8c disconnects the gear 8a from the first shaft 6, and comes to a non-engaging state in which the power from the motor/generator MG2 can not be transmitted from the second shaft 7 to the first shaft 6 by the gears 8b and 8a.

The shifting operation in the axial direction of the coupling sleeve 8f is carried out by a hydraulic actuator (not shown).

The high side shift mechanism 9 is provided for connecting a gear 9a to the second shaft 7 and disconnecting the gear 9a from the second shaft 7 so that a high speed stage gear set constituted by the gear 9a which is rotatably supported on the second shaft 7, and a gear 9b which rotates together with the first shaft 6 connects in a driving manner between the first shaft 6 and the second shaft 7, and is configured by a friction clutch 9c which serves as a friction type shift element as described below.

The friction clutch 9c includes a driven side clutch disc 9d which rotates together with the gear 9a, a drive side clutch disc 9e which rotates together with the second shaft 7, and a hydraulic type clutch piston 9f, and functions as follows.

In the case that the clutch piston 9f operates so as to bring the clutch discs 9d and 9e into friction contact with each other by a hydraulic pressure, the friction clutch 9c comes to a connecting state in which the motor power from the motor/generator MG2 can be transmitted from the second shaft 7 to the first shaft 6 by the gears 9a and 9b so as to output, by connecting in a driving manner the gear 9a to the second shaft 7.

In the case that the clutch piston 9f does not operate due to disappearance of the actuating hydraulic pressure, and the clutch discs 9d and 9e are not brought into friction contact with each other, the friction clutch 9c does not connect in the driving manner the gear 9a to the second shaft 7, and comes to a disconnecting state in which the motor power from the motor/generator MG2 can not be transmitted from the second shaft 7 to the first shaft 6 by the gears 9a and 9b.

It goes without saying that a gear ratio between the gears 9a and 9b is set to be smaller than a gear ratio between the gears 8b and 8a constructing the low speed stage gear set, so as to serve as the high speed stage gear set.

Further, a gear is set to an outer periphery of the ring gear RG constructing the power distribution device 2, the gear 9b constructing the high speed stage gear set is engaged with the gear of the outer periphery of the ring gear RG, and the power transmission can be carried out between the first shaft 6 and the ring gear RG of the power distribution device 2.

A gear 11 is connected to the first shaft 6, and a differential gear device 13 is connected in a driving manner to the first shaft 6 via a final drive gear set which is configured by the gear 11, and a gear 12 engaging with the gear 11.

As a result, the motor power of the motor/generator MG2 arriving at the first shaft 6 is transmitted to right and left drive wheels 14 (only one drive wheel is shown in FIG. 1) via the final drive gear set 11 and 12 and the differential gear device 13.

<Action of Embodiment>

The engine 1 drives the motor/generator MG1 via the power distribution device 2, and accumulates electric power generated by the motor/generator MG1 in a battery (not shown).

The motor/generator MG2 is driven by obtaining the electric power of the above described battery, and the motor power from the motor/generator MG2 is transmitted as follows.

In the case that the dog clutch 8c is in the non-engaging state in which the dog clutch does not rotationally engage the gear 8a with the first shaft 6, and the motor power from the motor/generator MG2 can not be transmitted from the second shaft 7 to the first shaft 6 by the gears 8b and 8a, and the friction clutch 9c is in the disengaging state in which the friction clutch 9c does not connect in the driving manner the gear 9a to the second shaft 7, and the motor power from the motor/generator MG2 can not be transmitted from the second shaft 7 to the first shaft 6 by the gears 9a and 9b, the automatic transmission is in a neutral state in which the motor power is not directed to the drive wheels, and the vehicle can be stopped.

In the low speed stage selecting case that the dog clutch 8c is in the engaging state in which the dog clutch 8c rotationally engages the gear 8a with the first shaft 6, and the motor power from the motor/generator MG2 can be transmitted from the second shaft 7 to the first shaft 6 by the gears 8b and 8a, the motor power to the second shaft 7 is directed to the drive wheels 14 via the gears 8b and 8a, the dog clutch 8c in the engaging state, the first shaft 6, the final drive gear sets 11 and 12, and the differential gear device 13, and the automatic transmission can drive the wheels 14 in the low speed stage so as to make the vehicle travel at a low speed.

In the high speed stage selecting case that the friction clutch 9c is in the connecting state in which the friction clutch 9c connects in the driving manner the gear 9a to the second shaft 7, and the motor power from the motor/generator MG2 can be transmitted from the second shaft 7 to the first shaft 6 by the gears 9a and 9b, the motor power to the second shaft 7 is directed to the drive wheels 14 via the gears 9a and 9b, the friction clutch 9c in the engaging state, the first shaft 6, the final drive gear sets 11 and 12, and the differential gear device 13, and the automatic transmission can drive the wheels 14 in the high speed stage so as to make the vehicle travel at a high speed.

In the regenerative braking case during the low speed or high speed traveling described above, the motor/generator MG1 can carry out power generation in accordance with a power generation load and carry out a predetermined regenerative braking, the motor/generator MG1 being driven via the power distribution device 2 by the gear 9b rotating together with the first shaft 6 which is always connected to the wheels 14, by applying the power generation load to the motor/generator MG1, and can accumulate the generated power at this time in the battery.

Note that, the motor/generator MG1 not only is used as the power generator, but also serves as the electric motor for complementing power scarcity in a driving state in which the power scarcity is caused only by the power from the motor/generator MG2.

At this time, the engine 1 is driven so as to complement the power scarcity as necessary.

<Shift Control System>

A description will be given below of a shift control system which controls the gear shift between the low speed stage and the high speed stage of the automatic transmission mentioned above, on the basis of FIG. 1.

There is provided a controller 21 carrying out a shift switching control between the engaging state and the non-engaging state of the dog clutch 8c (the coupling sleeve 8O, and a hydraulic operation control between the disconnecting state and the connecting state of the friction clutch 9c (the clutch piston 9f), which should be carried out in the gear shifting of the automatic transmission.

Further, to the controller 21, there are input a signal from a vehicle speed VSP sensor 22 which detects a vehicle speed VSP, a signal from an accelerator sensor 23 which detects a stepping stroke amount STacc of the accelerator pedal, and a signal from a brake sensor 24 which detects a stepping stroke amount STbrk of the brake pedal.

The controller 21 shift-controls the automatic transmission as follows on the basis of a shift map exemplified in FIG. 2, by using the input information.

Figure 2:
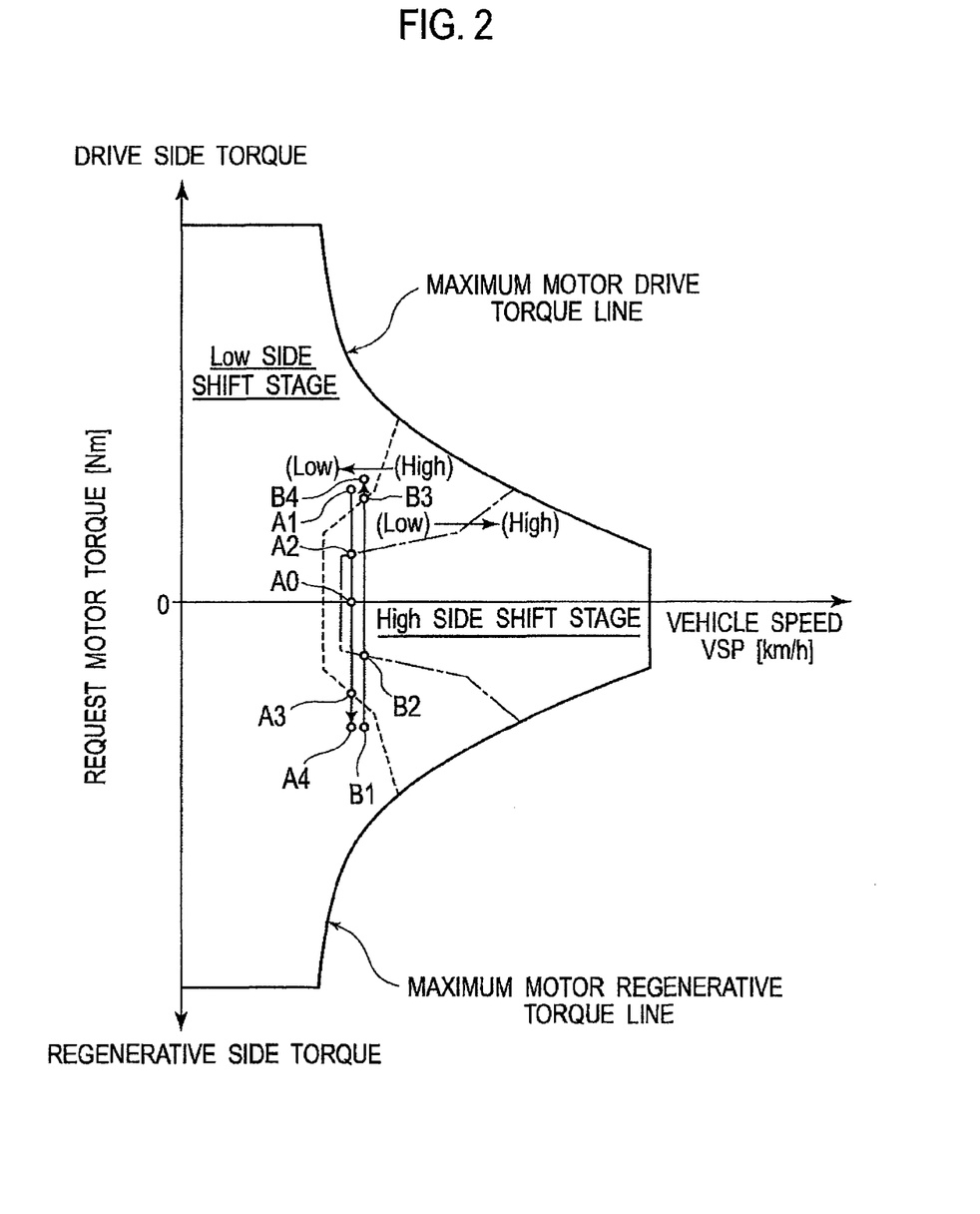
FIG. 2 is a shift line map exemplifying a shift pattern of the automatic transmission in FIG. 1.

In FIG. 2, thick solid lines indicate a maximum motor driving torque line which is obtained by connecting maximum motor driving torque values of the motor/generator MG2 per vehicle speed VSP, and a maximum motor regenerative torque line which is obtained by connecting maximum motor regenerative torque values of the motor/generator MG2 per vehicle speed VSP, and an area surrounded by these lines is a practicable area.

Taking into consideration a transmission loss of the automatic transmission and a motor loss of the motor/generator MG2, a (Low→High) up-shift line shown by a single-dot chain line and a (High→Low) down-shift line shown by a broken line are set within the practicable area.

The (Low→High) up-shift line is positioned closer to a high vehicle speed side only by a hysteresis than the (High→Low) down-shift line.

If the accelerator pedal is stepped down, the controller 21 determines a target shift stage (a low speed stage or a high speed stage) which is preferable for the current driving state, on the basis of the shift map in FIG. 2, by using a request motor driving torque determined from the accelerator pedal stepping stroke amount STacc, and the vehicle speed VSP.

If the brake pedal is stepped down, the controller 21 determines a target shift stage (a low speed stage or a high speed stage) which is preferable for the current driving state, on the basis of the shift map in FIG. 2, by using a request motor regenerative torque determined from the brake pedal stepping stroke amount STbrk, and the vehicle speed VSP.

In the case that the target shift stage determined as mentioned above is the low speed stage, the controller 21 rotationally engages the gear 8a with the first shaft 6 by setting the dog clutch 8c to the engaging state, and set a low speed stage selecting state in which the motor power from the motor/generator MG2 is transmitted from the second shaft 7 to the first shaft 6 via the gears 8b and 8a, by setting the friction clutch 9c to the disconnecting state so as to disconnect the gear 9a from the second shaft 7.

Further, in the case that the target shift stage determined as mentioned above is the high speed stage, the controller 21 connects in the driving manner the gear 9a to the second shaft 7 by setting the friction clutch 9c to the connecting state, and sets a high speed stage selecting state in which the motor power from the motor/generator MG2 is transmitted from the second shaft 7 to the first shaft 6 via the gears 9a and 9b, by setting the dog clutch 8c to the non-engaging state so as to disconnect the gear 8a from the first shaft 6.

In the case of the low speed stage selecting state (actual shift stage=low speed stage), the controller 21 switches the target shift stage to the high speed stage, and shifts up the automatic transmission from the low speed stage to the high speed stage, when the driving point in the practicable area goes beyond the (Low→High) up-shift line and enters the high (High) side shift stage area. In the case of the high speed stage selecting state (actual shift stage=high speed stage), the controller 21 switches the target shift stage to the low speed stage, and shifts down the automatic transmission from the high speed stage to the low speed stage, when the driving point in the practicable area goes beyond the (High→Low) down-shift line and enters the low (Low) side shift stage area.

<Problem and Countermeasure of Normal Shift Control>

The shift control mentioned above is a normal shift control, but the following problems are generated in this case.

First of all, a description will be given of a problem in the case of driving so that the driving point reaches A4 from A1 via A2 and A3 in FIG. 2.

Figure 3:
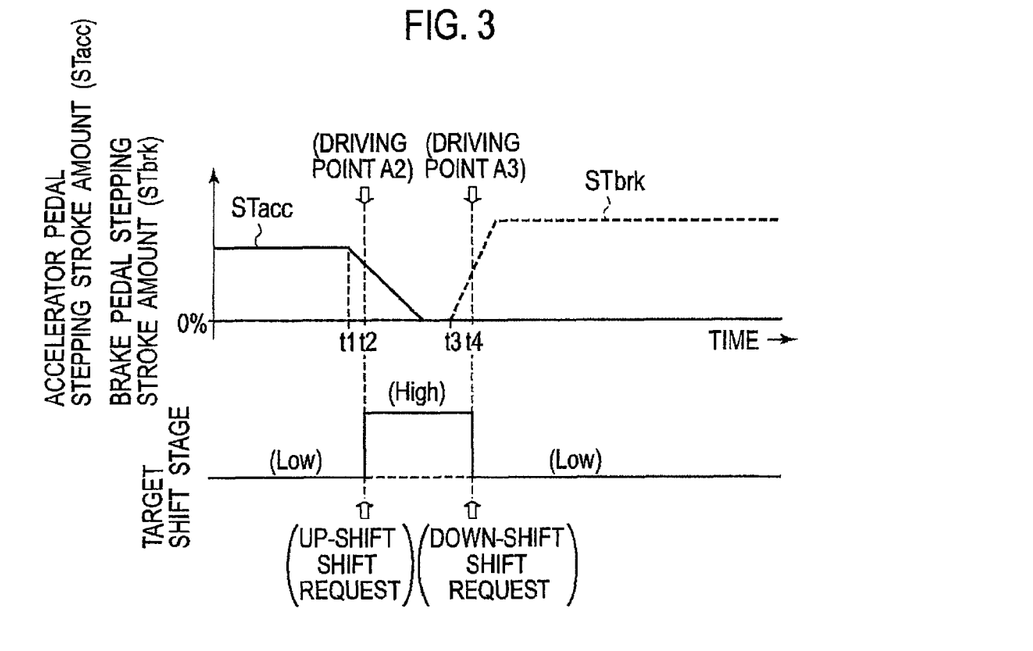
FIG. 3 is a shift operation time chart in the case that a driving point is changed like A1→A2→A3→A4 in FIG. 2.

The driving point A1 is a state in which the motor/generator MG2 generates the motor driving torque by stepping down the accelerator pedal (accelerator pedal stepping stroke amount STacc>0), the automatic transmission is set to the low speed stage selecting state in response to target shift stage= (Low), and the motor driving torque from the motor/generator MG2 is directed to the drive wheels 14 via the automatic transmission in the low speed stage selecting state, like a time point before a moment t1 in FIG. 3.

In the case that the motor driving torque is lowered toward zero by releasing the accelerator pedal (reducing the accelerator pedal stepping stroke amount STacc), like a time point after the moment t1 in FIG. 3, from the state (the driving point A1), the driving point is further lowered via A2 from A1 in FIG. 2, and reaches A0.

Since the driving point enters the high (High) side shift stage area in FIG. 2 at a moment t2 in FIG. 3 when the driving point passes through A2, the target shift stage comes to a high speed stage as shown in FIG. 3, an up-shift request to the high speed stage is generated, and the automatic transmission is shifted up to the high speed stage from the low speed stage selecting state.

Thereafter, in the case that the brake pedal stepping stroke amount STbrk is generated by stepping down the brake pedal like a time point after a moment t3 in FIG. 3, the motor/generator MG2 is going to generate the motor regenerative torque which becomes larger along with the increase of the brake pedal stepping stroke amount STbrk, and the driving point finally runs into A4 via A3 in FIG. 2.

Since the driving point yet exists in the high (High) side shift stage area in FIG. 2 until a moment t4 in FIG. 3 running into the driving point A3, the target shift stage is maintained in the high speed stage, and the automatic transmission maintains the high speed stage selecting state.

Accordingly, the above described motor regenerative torque from the motor/generator MG2 is directed to the drive wheels 14 via the automatic transmission in the high speed stage selecting state.

Since the driving point enters the low (Low) side shift stage area in FIG. 2 at the moment t4 in FIG. 3 that the driving point passes through A3, the target shift stage comes to the low speed stage as shown in FIG. 3, the down-shift request to the low speed stage is generated, and the automatic transmission is shifted down to the low speed stage from the high speed stage selecting state.

The driving point A4 is a state in which the motor/generator MG2 generates the motor regenerative torque as mentioned above by stepping down the brake pedal (brake pedal stepping stroke amount STbrk>0), the automatic transmission is set to the low speed stage selecting state as mentioned above in response to target shift stage=low speed stage, and the motor regenerative torque from the motor/generator MG2 is directed to the drive wheels 14 via the automatic transmission in the low speed stage selecting state, like a time point after the moment t4 in FIG. 3.

As is apparent from the description mentioned above, in the case of driving so that the driving point runs into A4 via A2 and A3 from A1 in FIG. 2, by releasing the accelerator pedal from the stepping state and thereafter stepping down the brake pedal, the repeated gear shift is repeated for a short time, the repeated gear shift being configured such that the automatic transmission is temporarily shifted up to the high speed stage selecting state from the low speed stage selecting state, and is shifted down to the low speed stage selecting state from the high speed stage selecting state just after the up-shift. Therefore, not only an uncomfortable feeling is given to the driver, but also the plural times of shift shocks are generated for a short time, and in any case, the reduction of the shift quality is unavoidable.

Even in the case of driving so that the driving point runs into B4 via B2 and B3 from B1 in FIG. 2, the same problem is generated as described below.

Figure 4:
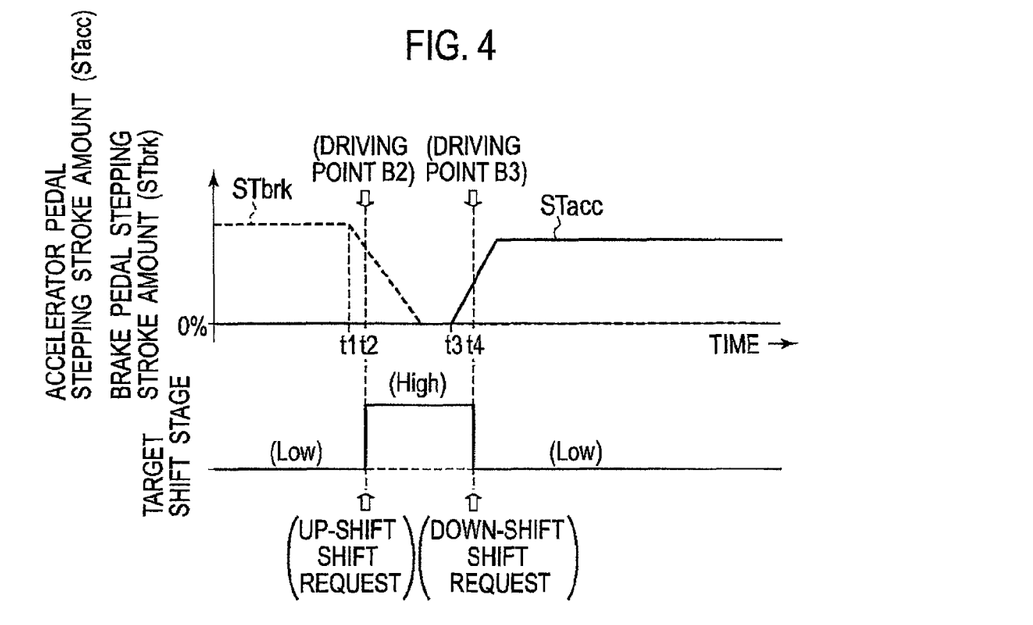
FIG. 4 is a shift operation time chart in the case that the driving point is changed like B1→B2→B3→B4 in FIG. 2.

The driving point B1 is a state in which the motor/generator MG2 generates the motor regenerative torque by stepping down the brake pedal (brake pedal stepping stroke amount STbrk>0), the automatic transmission is set to the low speed stage selecting state in response to target shift stage=low speed stage, and the motor regenerative torque from the motor/generator MG2 is directed to the drive wheels 14 via the automatic transmission in the low speed stage selecting state, like a time point before the moment t1 in FIG. 4.

The driving point further rises via B2 from B1 in FIG. 2 by lowering the motor regenerative torque toward zero by releasing the brake pedal (lowering the brake pedal stepping stroke amount STbrk), like a time point after the moment t1 in FIG. 4, from the state (the driving point B1).

Since the driving point enters the high (High) side shift stage area in FIG. 2 at a moment t2 in FIG. 4 that the driving point passes through B2, the target shift stage comes to the high speed stage as shown in FIG. 4, the up-shift request to the high speed stage is generated, and the automatic transmission is shifted up to the high speed stage from the low speed stage selecting state.

In the case that the accelerator pedal stepping stroke amount STacc is thereafter generated by stepping down the accelerator pedal like a time point after a moment t3 in FIG. 4, the motor/generator MG2 is going to generate a motor driving torque which becomes larger along with an increase of the accelerator pedal stepping stroke amount STacc, and the driving point finally runs into B4 via B3 in FIG. 2.

Since the driving point is yet in the high (High) side shift stage area until the moment t4 in FIG. 4 that the driving point runs into the driving point B3, the target shift stage maintains the high speed stage, and the automatic transmission maintains the high speed stage selecting state.

Accordingly, the above described motor driving torque from the motor/generator MG2 is directed to the drive wheels 14 via the automatic transmission in the high speed stage selecting state.

Since the driving point enters the low (Low) side shift stage area in FIG. 2 at the moment t4 in FIG. 4 that the driving point passes through B3, the target shift stage comes to the low speed stage as shown in FIG. 4, the down-shift request to the low speed stage is generated, and the automatic transmission is shifted down to the low speed stage from the high speed stage selecting state.

The driving point B4 is a state in which the motor/generator MG2 generates the motor driving torque as mentioned above by stepping down the accelerator pedal (accelerator pedal stepping stroke amount STacc>0), the automatic transmission is set to the low speed stage selecting state in response to target shift stage=low speed stage, and the motor driving torque from the motor/generator MG2 is directed to the drive wheels 14 via the automatic transmission in the low speed stage selecting state, like a time point after the moment t4 in FIG. 4.

As is apparent from the description mentioned above, in the case of driving so that the driving point runs into B4 via B2 and B3 from B1 in FIG. 2, by releasing the brake pedal from the stepping state and thereafter stepping down the accelerator pedal, the repeated gear shift is repeated for a short time, the repeated gear shift being configured such that the automatic transmission is temporarily shifted up to the high speed stage selecting state from the low speed stage selecting state, and is shifted down to the low speed stage selecting state from the high speed stage selecting state just after the up-shift. Therefore, not only an uncomfortable feeling is given to the driver, but also the plural times of shift shocks are generated for a short time, and in any case, the reduction of the shift quality is unavoidable.

Figure 5:
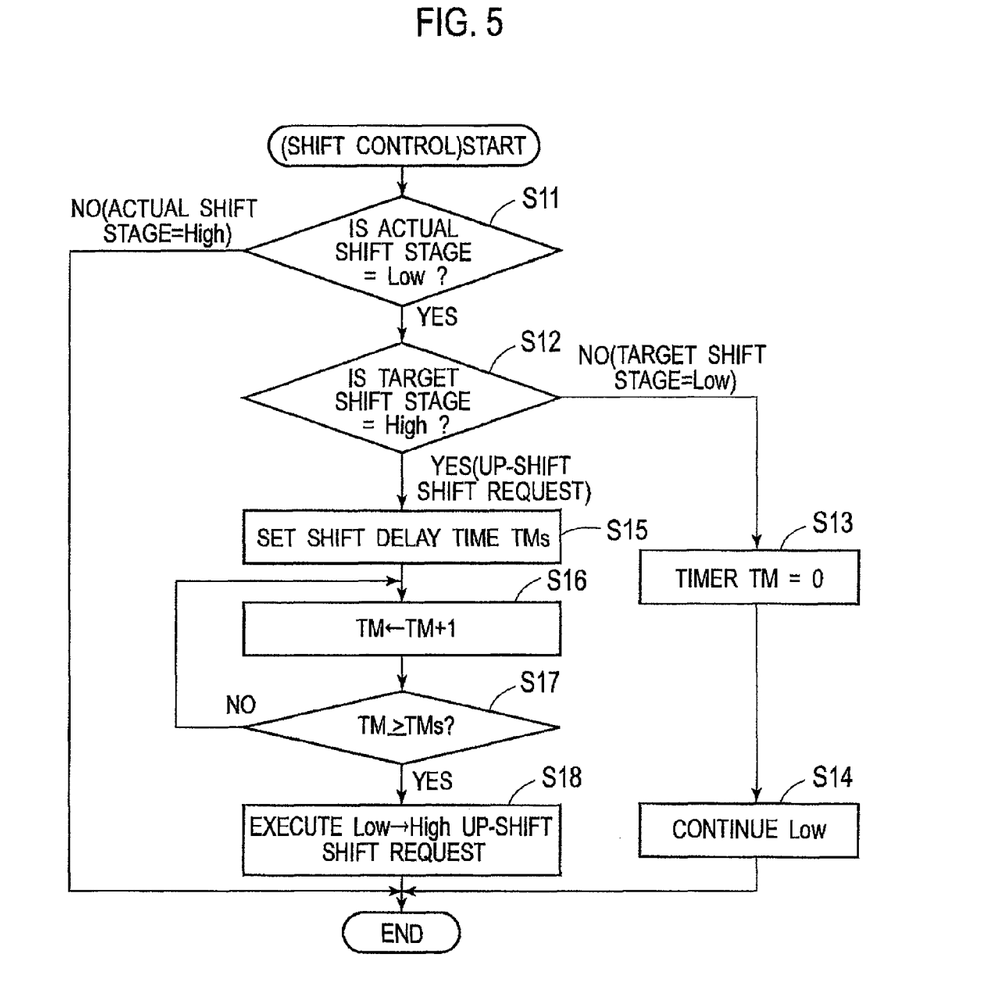
FIG. 5 is a flow chart showing a shift control program which a controller in FIG. 1 executes for preventing a repeated gear shift.
Figure 6:
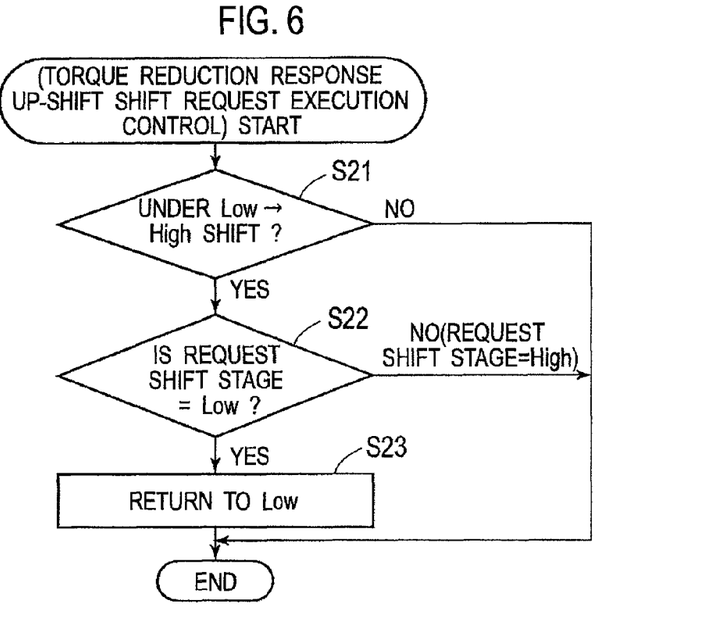
FIG. 6 is a flow chart showing a sub routine relating to a torque reduction response up-shift process in FIG. 5.

The present embodiment is configured such that the controller 21 in FIG. 1 executes a control program shown in FIGS. 5 and 6 and shift-controls the automatic transmission, so as to avoid the problem relating to the reduction of the shift quality by preventing the automatic transmission from carrying out the repeated gear shift mentioned above for a short time, even in the case that the driving operation (A1→A2→A3→A4, or B1→B2→B3→B4) as mentioned above is carried out.

In the case of the gear shift on the basis of the shift map in FIG. 2, the repeated gear shift generating the problem mentioned above is only low speed stage→high speed stage→low speed stage, and the repeated gear shift of high speed stage→low speed stage→high speed stage does not exist. Therefore, a step S11 in FIG. 5 first of all checks on the basis of inside information of the controller 21 itself whether or not the shift stage selecting state (the actual shift stage) of the current automatic transmission is the low speed stage (Low).

In the case that the actual shift stage is not the low speed stage, that is, in the case that the actual shift stage is the high speed stage, the repeated gear shift do not occur, and the problem mentioned above is not generated, and thus, the control is finished as it is.

In the case that the step S11 determines actual shift stage=low speed stage, the repeated gear shift causing the problem may be generated, and therefore, a step S12 determines the probability according to whether or not the target shift stage determined on the basis of FIG. 2 is the high speed stage.

If the target shift stage is not the high speed stage, that is, if the target shift stage is the low speed stage, actual deceleration stage=target shift stage=low speed stage is established and the gear shift is not necessary, and therefore, a step S13 resets a clocking timer TM for a control mentioned later to zero, and a step S14 thereafter maintains the automatic transmission in the current low speed stage selecting state.

Determining actual shift stage=low speed stage in the step S11, and determining target shift stage=high speed stage in the step S12 means generation of divergence of the target shift stage in relation to the actual shift stage (the low speed stage) (the torque reduction response up-shift request) along with the reduction of the motor driving torque caused by releasing the accelerator pedal (shown by A1→A2 in FIG. 2), or along with the reduction of the motor regenerative torque caused by releasing the brake pedal (shown by B1→B2 in FIG. 2).

Therefore, the step S11 and the step S12 correspond to the torque-reduction-response-shift-request determining unit in the present invention.

In the case that the step S11 determines actual shift stage=low speed stage, and the step S12 determines target shift stage=high speed stage, the repeated gear shift (low speed stage→high speed stage→low speed stage) may be generated and the problem mentioned above may arise. Accordingly, the control is advanced to a step S15 and after so as to prevent the repeated gear shift from being generated.

The step S15 sets a shift delay time TMs, and the setting of the shift delay time TMs is carried out as follows.

Figure 7:
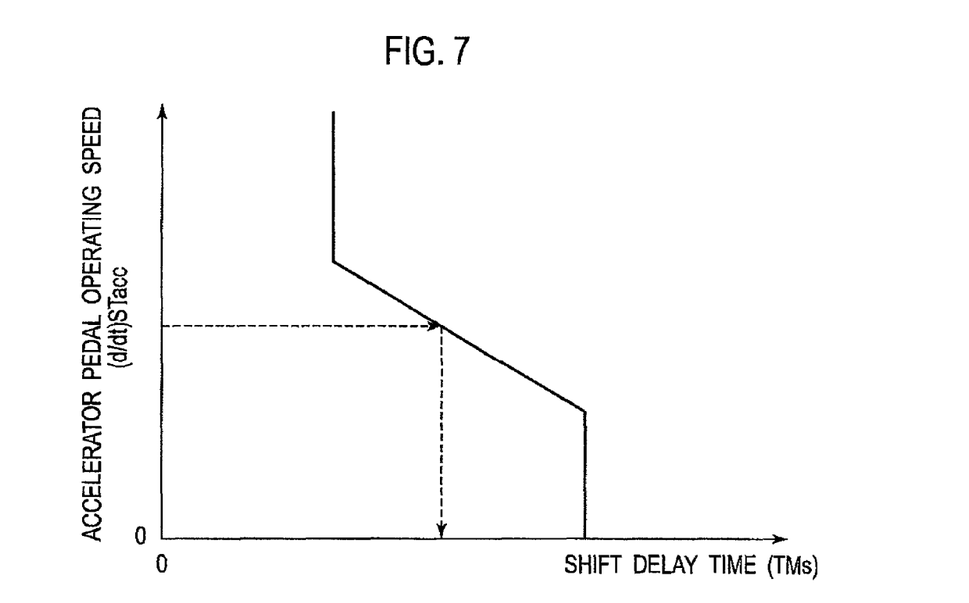
FIG. 7 is a change characteristic view showing a shift delay time of an accelerator pedal operation speed response which is set in the control program in FIG. 5.
Figure 8:
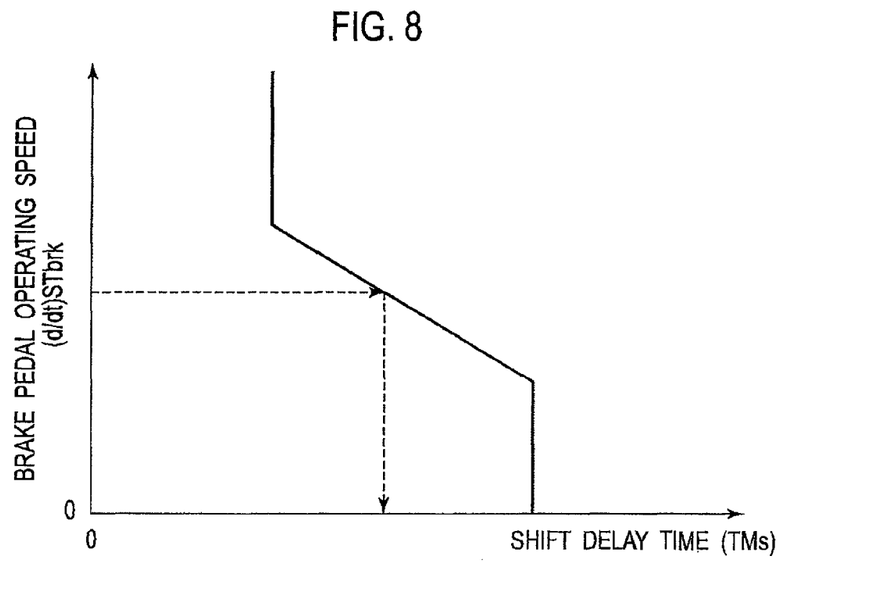
FIG. 8 is a change characteristic view showing a shift delay time of a brake pedal operation speed response which is set in the control program in FIG. 5.

In the case of the up-shift request along with the reduction of the motor driving torque caused by releasing the accelerator pedal (shown by A1→A2 in FIG. 2), the shift delay time TMs is set from a releasing speed (d/dt)STacc of the accelerator pedal on the basis of a map in FIG. 7, and in the case of the up-shift request along with the reduction of the motor regenerative torque caused by releasing the brake pedal (shown by B1→B2 in FIG. 2), the shift delay time TMs is set from a releasing speed (d/dt)STbrk of the brake pedal on the basis of a map in FIG. 8.

Note that, the higher the releasing speed (d/dt) STacc of the accelerator pedal and the releasing speed (d/dt)STbrk of the brake pedal is, the longer the shift delay time TMs is, as shown in FIGS. 7 and 8.

As is apparent from FIG. 2, the shift request of the automatic transmission is generated by changing the vehicle speed VSP (the transmission output rotational speed), and the shift delay time TMs exemplified in FIGS. 7 and 8 is made longer than the shift delay time at the gear shifting time in response to the vehicle speed VSP (the transmission output rotational speed).

The next step S16 increments (steps forward) the timer TM which is reset to zero in the step S13, and measures a lapsed time from the determination of the torque reduction response up-shift request along with the reduction of the motor torque in the steps S11 and S12.

A step S17 checks whether or not the lapsed time (denoted by the same reference symbol TM in the drawing as a matter of convenience) of the timer TM reaches the shift delay time TMs set in the step S15, and returns the control to the step S16 so as to continuously carry out the clocking mentioned above as long as the lapsed time does not reach.

In the case that the step S17 determines that the measuring time of the timer TM reaches the shift delay time TMs, a step S18 executes the up-shift request of the above described torque reduction response and shifts up the automatic transmission from the current low speed stage selecting state to the high speed stage.

Therefore, the steps S16 to S18 correspond to the torque-reduction-response-shift delaying unit in the present invention.

The torque reduction response up-shift executed in the step S18 at the passing time of the shift delay time TMs is in detail as shown in FIG. 6.

A step S21 checks whether or not the torque reduction response up-shift mentioned above is under execution.

Since the control in FIG. 6 is not necessary as long as the torque reduction response up-shift is not under execution, the step escapes from the control program in FIG. 6 as it is.

In the case that the step S21 discriminates that the torque reduction response up-shift is under execution, a step S22 checks whether or not the target shift stage on the basis of the shift pattern in FIG. 2 is the low speed stage.

If the target shift stage is not the low speed stage but the high speed stage, the target shift stage is a shift stage in a forward direction in relation to the up-shift discriminated by the step S21, and continuation of the up-shift is permissible, and therefore, the up-shift is continuously advanced by finishing the control as it is.

However, in the case that the step S22 determines that the target shift stage is the low speed stage (target shift stage=low speed stage is established by the increase of the motor torque absolute value caused by stepping down the accelerator pedal or the brake pedal), the target shift stage is a shift stage in a reverse direction in relation to the up-shift discriminated in the step S21, and the gear shift is a gear shift which is adverse to target shift stage=low speed stage according to the continuation of the up-shift, and therefore, a step S23 cancels the current executed up-shift and carries out a gear shift for returning the automatic transmission to the low speed stage selecting state.

Therefore, the step S22 corresponds to the reverse-direction-shift-request determining unit in the present invention, and the step S23 corresponds to the reverse-direction-shift executing unit in the present invention.

Note that, in the case that the step S23 cancels the current executed up-shift and carries out the shift for returning to the low speed stage selecting state, it is possible to cancel the up-shift in progress and gear shift to return to the low speed stage selecting state, by immediately maintaining the connecting force of the friction clutch 9c which is in a transition period during the up-shift, increasing the motor torque of the motor/generator MG2 under the state so as to rotationally synchronize the dog clutch 8c via the slip of the friction clutch 9c, engaging the dog clutch 8c in the rotation synchronizing state, and thereafter releasing the friction clutch 9c.

<Effect of Embodiment>

According to the shift control of the present embodiment mentioned above with regard to FIGS. 5 and 6, the following effects can be obtained.

Figure 9:
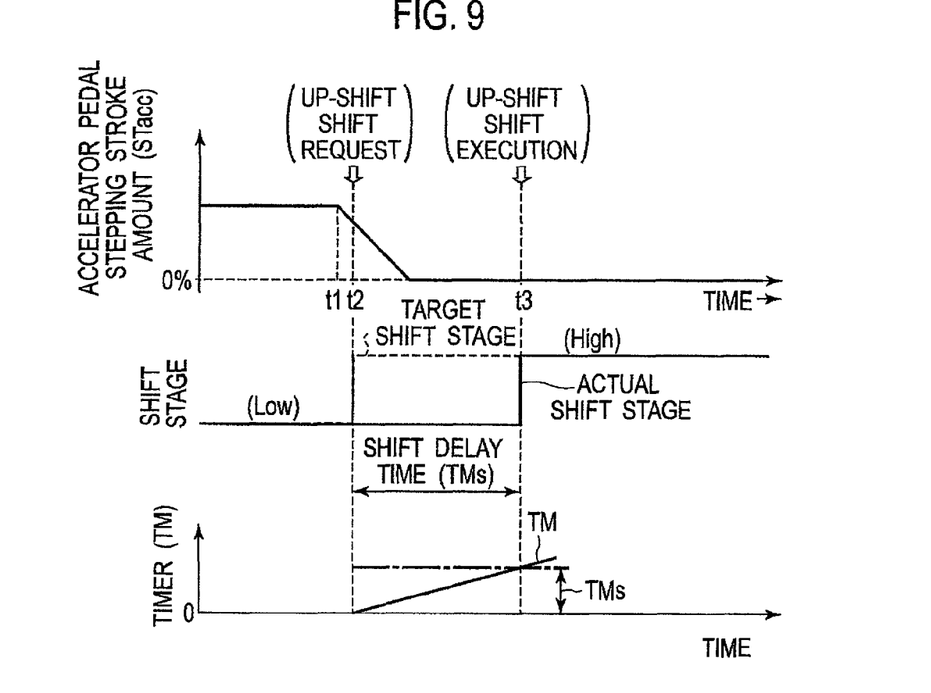
FIG. 9 is a time chart of a shift operation according to the shift control in FIG. 5.

A description will be given of the case that the driving point runs into A0 which corresponds to motor driving torque=0 via A2 from A1 in FIG. 2, by reducing the motor driving torque toward zero according to the same accelerator pedal releasing operation as that in FIG. 3 (the reduction of the accelerator pedal stepping stroke amount STacc to zero) from the moment t1 as shown in FIG. 9.

Since the driving point enters the high (High) side shift stage area in FIG. 2 at the moment t2 in FIG. 9 that the driving point passes through A2, the target shift stage comes to the high speed stage as shown in FIG. 9, and the torque reduction response up-shift request to the high speed stage along with the torque reduction is generated.

However, in the present embodiment, the automatic transmission is not immediately shifted up to the high speed stage from the low speed stage selecting state at the moment t2 requesting the torque reduction response up-shift in FIG. 9, the start of executing the torque reduction response up-shift request is delayed as follows.

In other words, the lapsed time from the torque reduction response up-shift request moment t2 in FIG. 9 is measured by the increment (stepping) of the timer TM as shown in FIG. 9 (step S16).

In the case that the measured value of the timer TM (the lapsed time from the torque reduction response up-shift request moment t2) runs into a moment t3 in FIG. 9 that indicates the delay time TMs set in the step S15 in FIG. 5 (step S17), the step executes the torque reduction response up-shift request, and shifts up the automatic transmission from the current low speed stage selecting state to the high speed stage (step S18).

In the meanwhile, in the case that the up-shift request in response to the torque reduction (the accelerator pedal releasing) is issued as mentioned above, it is highly likely that the increase of the motor regenerative toque is requested by the braking operation just after the up-shift request. In response thereto, the down-shift request in the returning direction of the automatic transmission is generated at a high probability.

Therefore, in the case that the shift request is executed immediately when the up-shift request in response to the torque reduction (the accelerator pedal releasing) is generated, the repeated gear shift is repeated for a short time as mentioned above with regard to FIG. 3. As a result, the plural times of shift shocks are generated for a short time as well as an uncomfortable feeling is applied, and in any case, a problem relating to the reduction of the shift quality is generated.

According to the present embodiment, the shift request is not executed immediately even if the up-shift request in response to the torque reduction (the accelerator pedal releasing) is generated (the moment t2 in FIG. 9), and the shift request is executed for the first time when the delay time TMs elapses after the shift request, that is, the moment t3.

Therefore, even in the case that the request for increasing the motor regenerative torque by the braking operation is issued just after (t2 to t3) the up-shift request moment t2 in response to the torque reduction (the accelerator pedal releasing), the gear shift is not generated in response thereto, and it is possible to avoid the repeat of the repeated gear shift for a short time as mentioned above.

Accordingly, it is possible to improve the shift quality without generating any uncomfortable feeling caused by the repeated gear shift, and any problem relating to the plural times of shift shocks for a short time.

It goes without saying that the operation and effect at the accelerator pedal releasing time mentioned above with regard to FIG. 9 can be obtained in the same manner in the case that the driving point runs into the driving point corresponding to motor regenerative torque=0 via B2 from B1 in FIG. 2, by reducing the motor regenerative torque toward zero on the basis of the same brake pedal releasing operation (reduction to zero of the brake pedal stepping stroke amount STbrk) as mentioned above with regard to FIG. 4.

Further, in the present embodiment, since the shift delay time TMs is made longer than the shift start response delay at the shifting time along with the change of the vehicle speed VSP (the transmission output rotational speed), it is possible to further securely achieve the operation and effect mentioned above.

Further, since the shift delay time TMs is made longer as the releasing speed (d/dt)STacc of the accelerator pedal and the releasing speed (d/dt)STbrk of the brake pedal are higher, that is, the reducing speed of the motor torque absolute value is higher, as mentioned above with regard to FIGS. 7 and 8, the following effect can be obtained.

In other words, the higher the releasing speed (d/dt)STacc of the accelerator pedal and the releasing speed (d/dt)STbrk of the brake pedal are, the higher the probability that the step change from the accelerator pedal to the brake pedal or from the brake pedal to the accelerator pedal is carried out just after the releasing is. Then, the repeated gear shift tends to be generated. However, the repeated gear shift is securely prevented from being generated so as to further significantly achieve the effect mentioned above, by making the shift delay time TMs longer as the releasing speed (d/dt)STacc of the accelerator pedal and the releasing speed (d/dt)STbrk of the brake pedal are hither.

In the case that the releasing speed (d/dt)STacc of the accelerator pedal and the releasing speed (d/dt)STbrk of the brake pedal are slow, the shift delay time TMs does not unnecessarily become longer, and it is possible to achieve the effect mentioned above while minimizing the shift response delay caused by the shift delay time TMs.

Further, in the present embodiment, in the case that target shift stage=low speed stage causing the shift request in the reverse direction is established during the torque reduction response shift (up-shift) in the step S18 (step S22), the torque reduction response shift (up-shift) is cancelled, and the reverse gear shift in response to target shift stage=low speed stage is executed, and accordingly, the reverse gear shift in response to target shift stage=low speed stage is secured even in the torque reduction response shift (up-shift), and it is possible to prevent a traveling performance from being sacrificed while achieving the driving force according to the pedal operation of the driver.

Other Embodiments

Note that, in the illustrated embodiment mentioned above, the description is given of the case that the automatic transmission is the two-stage automatic transmission which only has the low speed stage and the high speed stage. However, the present invention can be applied in the same manner to a multistage automatic transmission having more stages. The same effect can be achieved in this case while preventing the repeated gear shift between the adjacent shift stages.

Further, in the illustrated embodiment mentioned above, the description is given of the technique of preventing the repeated gear shift in the case that the shift pattern is shown in FIG. 2 and the repeated gear shift is low speed stage→high speed stage→low speed stage. However, the repeated gear shift may be high speed stage→low speed stage→high speed stage according to the shift pattern. The present invention can achieve the same operation and effect even by being configured as a technique of preventing this repeated gear shift.

The invention claimed is:

1. A shift control device of an automatic transmission, which is used in the automatic transmission inserted into a power transmission system for transmitting power from an electric motor, and is configured to shift-control the automatic transmission on a shift pattern in accordance with a motor torque absolute value of the electric motor, the shift control device comprising:
   a torque-reduction-response-shift-request determining unit configured to determine a up-shift request of the automatic transmission on the shift pattern along with the reduction of the motor torque absolute value caused by releasing an accelerator pedal; and
   a torque-reduction-response-shift delaying unit configured to delay an execution start of the torque reduction response up-shift determined by the torque-reduction-response-shift-request determining unit, until when a set time elapses after the determining time.

2. The shift control device of the automatic transmission according to claim 1, which is further configured to shift-control the automatic transmission in accordance with a transmission output rotational speed, wherein the set time for the shift delaying is longer than a shift start delay time at the shifting time in accordance with the transmission output rotational speed.

3. The shift control device of the automatic transmission according to claim 1, wherein the set time for the shift delaying is longer as the reducing speed of the motor torque absolute value caused by releasing the accelerator pedal is higher.

4. The shift control device of the automatic transmission according to claim 1, further comprising:
   a reverse shift request determining unit configured to determine that a down-shift request in a reverse direction to the gear shift is generated during the torque reduction response up-shift which is started being delayed after the elapse of the set time; and
   a reverse shift executing unit configured to execute the down-shift request by cancelling the torque reduction response up-shift in the case that the down-shift request is determined by the reverse shift request determining unit.

5. A shift control method for an automatic transmission inserted into a power transmission system for transmitting power from an electric motor, comprising the steps of:
   shift-controlling the automatic transmission on a shift pattern in accordance with a motor torque absolute value of the electric motor;
   determining a up-shift request of the automatic transmission on the shift pattern along with the reduction of the motor torque absolute value caused by releasing an accelerator pedal; and
   delaying an execution start of the determined torque reduction response up-shift until when a set time elapses after the determining time.

* * * * *